(12) United States Patent
Alonso Sadaba et al.

(10) Patent No.: US 9,257,845 B2
(45) Date of Patent: Feb. 9, 2016

(54) POWER GENERATION PLANT VOLTAGE CONTROL

(75) Inventors: Oscar Alonso Sadaba, Sarriguren (ES); Teresa Arlaban Gabeiras, Sarriguren (ES); Igor Egaña Santamarina, Sarriguren (ES); Ricardo Royo Garcia, Sarriguren (ES); Jose Miguel Garcia Sayes, Sarriguren (ES); Miguel Nuñez Polo, Sarriguren (ES)

(73) Assignee: ACCIONA WINDPOWER, S.A., Sarriguren, Navarra (ES)

( * ) Notice: Subject to any disclaimer, the term of this patent is extended or adjusted under 35 U.S.C. 154(b) by 563 days.

(21) Appl. No.: 12/724,945

(22) Filed: Mar. 16, 2010

(65) Prior Publication Data

US 2010/0237834 A1    Sep. 23, 2010

(30) Foreign Application Priority Data

Mar. 17, 2009   (ES) .................................. 200900729

(51) Int. Cl.
| | |
|---|---|
| *G05F 1/70* | (2006.01) |
| *H02J 3/18* | (2006.01) |
| *F03D 7/02* | (2006.01) |
| *F03D 9/00* | (2006.01) |
| *H02J 3/38* | (2006.01) |

(52) U.S. Cl.
CPC ............. *H02J 3/1885* (2013.01); *F03D 7/0284* (2013.01); *F03D 9/003* (2013.01); *G05F 1/70* (2013.01); *F05B 2270/337* (2013.01); *H02J 3/386* (2013.01); *Y02E 10/723* (2013.01); *Y02E 10/763* (2013.01); *Y02E 40/32* (2013.01)

(58) Field of Classification Search
CPC ...... F03D 7/0284; F03D 9/003; H02J 3/1885; H02J 3/386; F05B 2270/337; Y02E 40/32; Y02E 10/723; Y02E 10/763; G05F 1/70
USPC ........... 323/205–211; 700/286, 291, 297, 298
See application file for complete search history.

(56) References Cited

U.S. PATENT DOCUMENTS 6,025,701 A * 2/2000 Weinhold ...................... 323/207
6,965,174 B2  11/2005 Wobben (Continued)

FOREIGN PATENT DOCUMENTS

| EP | 1433238 | 6/2004 |
|---|---|---|
| WO | WO 2009083448 | 7/2009 |

OTHER PUBLICATIONS

Merriam Webster Dictionary, http://www.merriam-webster.com/dictionary/estimate.*

*Primary Examiner* — Jessica Han
*Assistant Examiner* — Gustavo Rosario Benitez
(74) *Attorney, Agent, or Firm* — Merchant & Gould P.C.

(57) ABSTRACT

A method for controlling a power generation plant may be provided. First, an equivalent grid voltage may be estimated based on electric magnitudes measured at a connection point of the power generation plant and an equivalent model of a power grid to which the power generation plant is connected. Then, on the basis of said estimated equivalent voltage, a command indicative of reactive power to be produced by the power generation plant may be generated.

16 Claims, 9 Drawing Sheets

(56) References Cited

U.S. PATENT DOCUMENTS

| | | |
|---|---|---|
| 7,166,928 B2 | 1/2007 | Larsen |
| 7,505,833 B2 | 3/2009 | Delmerico |
| 2005/0042098 A1 | 2/2005 | Wobben |
| 2007/0233406 A1* | 10/2007 | Delmerico ......... G01R 19/2513 702/65 |
| 2008/0143304 A1* | 6/2008 | Bose et al. ................... 323/205 |
| 2008/0204044 A1* | 8/2008 | Ponnaluri ................ H02J 3/38 324/647 |
| 2008/0204054 A1* | 8/2008 | Wells ........................... 324/713 |
| 2010/0094474 A1* | 4/2010 | Larsen et al. ................. 700/287 |
| 2011/0148114 A1* | 6/2011 | Garcia .................... H02J 3/386 290/44 |

* cited by examiner

POWER GENERATION PLANT VOLTAGE CONTROL

RELATED APPLICATION

This application claims priority benefits based on Spanish Patent Application No. 200900729, filed Mar. 17, 2009, the disclosure of which is hereby incorporated herein by reference.

BACKGROUND

With the rising level of penetration of renewable energy plants into power grids, renewable energy plant generators are being required to offer various auxiliary services, such as voltage and frequency control, in order to ensure their correct integration into the grid. As a result, active and reactive power controls have been developed in order to contribute to frequency and voltage stabilization. The coordination and control of all the generation units comprising a renewable generation park, for example, may make it essential to have communication systems send necessary information to each unit.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A method for controlling a power generation plant may be provided. First, an equivalent grid voltage may be estimated based on electric magnitudes measured at a connection point of the power generation plant and an equivalent model of a power grid to which the power generation plant is connected. Then, on the basis of said estimated equivalent voltage, a command indicative of reactive power to be produced by the power generation plant may be generated. Both the foregoing general description and the following detailed description provide examples and are explanatory only.

Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
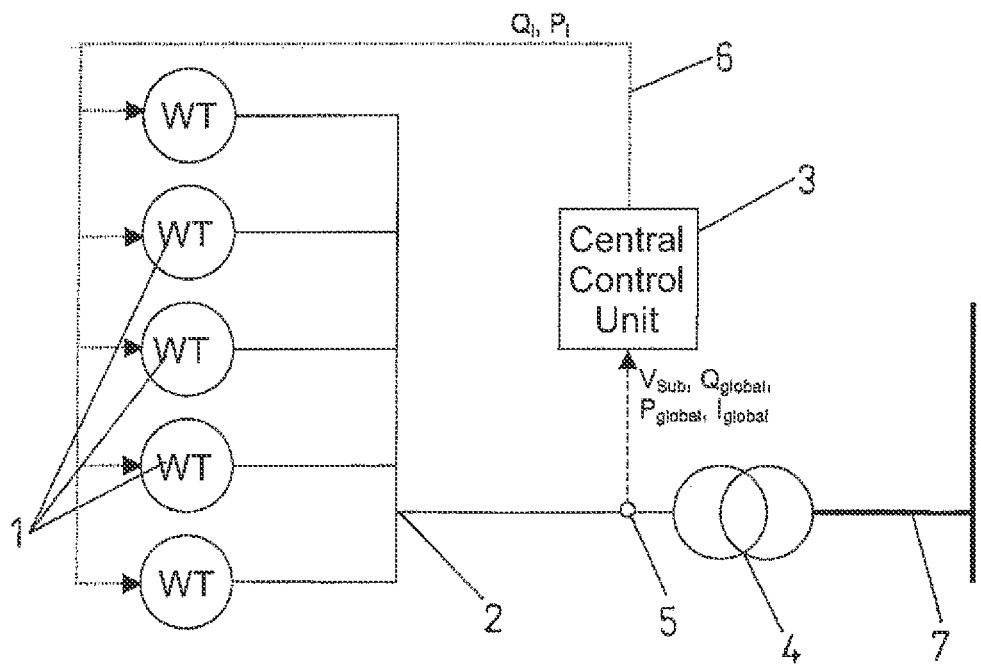
FIG. 1 shows an outline of a power generation plant.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Wind power generation is one renewable generation source that has increased at fast rate. The type of generator unit associated with wind power generation has traditionally used two different strategies to control voltage during normal functioning. The first strategy has been to incorporate wind generator voltage controllers in the terminal blocks of the wind turbine. One example of this type of control may be found in U.S. Pat. No. 6,965,174 B2.

This type of control may have a rapid response and may not require any additional control equipment in a corresponding substation, since the wind turbines may incorporate voltage controllers and measurements on terminals. However, this control type may have the disadvantage of only controlling local voltage, which is not a relevant value for the power grid provided that it remains within the specified operating ranges. At the same time, voltage at the connection point of a corresponding wind farm may not be controlled and therefore may be subject to variations.

The second strategy has been to incorporate controllers for the wind farm which, based on the voltage measured at the connection point of the wind farms, may send commands to the wind turbines related to reactive power or the power factor. Examples of this type of control may be found in EP Patent Application No. 1,433,238 and U.S. Pat. No. 7,166,928 B2.

The disadvantage of this solution may be that, in order to obtain a rapid response, a sophisticated computer grid may be required to connect a wind farm controller to the wind turbines. At the same time, in relation to delays that may exist from the moment the measurements are taken and the commands for the generator units are calculated at the substation, until the generator units receive them and generate in consequence (digital delays, and delays in communications and systems' response), there can be fluctuations in the voltage and in the generated reactive power.

Some grid codes may specify the level of reactive power that must be generated according to the deviation in voltage. Such standards, in many cases, may impose as a requirement a proportional voltage controller. The standards may also specify the response time required from this controller.

This type of control may entail the appearance of additional voltage fluctuations, depending on the type of grid to which the wind farm is connected (generally with low short-circuit power), the proportionality constant (or droop) required in the control, and the like. Consistent with embodiments of the invention, a voltage control method may be provided for a power generation plant which resolves the inconveniences mentioned above.

FIG. 1 shows an outline of a distributed generation plant (for example, a wind farm). The distributed generation plant may comprise, at least, generation units (or wind turbines) 1, a park grid 2, a central control unit 3, a transformer 4, a measurement unit 5 and a communication network 6. Said generation plant may be connected to a measurement unit 5 through transformer 4 which may adapt a voltage at park grid 2, or generation voltage level, to the voltage of park grid 7, or voltage level of the distribution or transport grid.

The central control unit 3 may receive information from the measurement unit 5 regarding active and reactive power generated by the generation plant, the voltage level or current ($P_{global}$, $Q_{global}$, $V_{Sub}$), measured either on the side of the distributed generation plant grid 2, or on the side of grid 7 to which the generation plant is connected. Said information may be used by the central control unit in order to calculate and send commands to the generator units regarding reactive and active power ($Q_i$, $P_i$) which may respond to the voltage and frequency controls that may be required by the corresponding grid operator.

Figure 2:
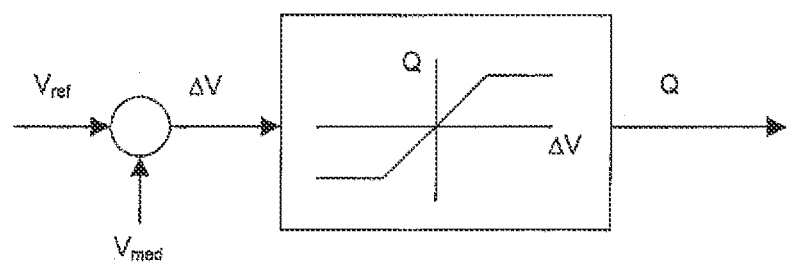
FIG. 2 shows a circuit diagram of a proportional voltage controller.

FIG. 2 shows a circuit diagram of a proportional voltage controller, according to what may be required by certain grid operators as the level of penetration of renewable generation increases. Said controller may establish an amount of reactive power to be generated (Q) by the generation plant proportional to the voltage error ($\Delta V$) existing between the measured voltage ($V_{Med}$) and the reference voltage ($V_{ref}$) at the point at which the control voltage may be carried out. As it may a proportional controller, said controller may not eliminate the error in the steady state voltage regime.

Figure 3:
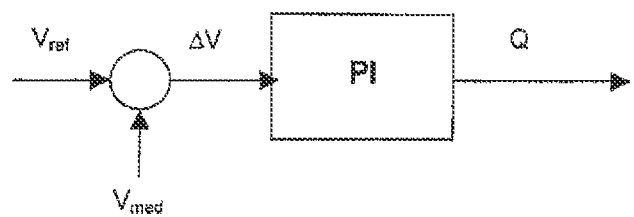
FIG. 3 shows a circuit diagram of a proportional-integral voltage controller.

FIG. 3 shows a proportional-integral controller (PI). Said controller, according to the voltage error ($\Delta V$), may establish an amount of reactive power to be generated by the power generation plant in such a way that the error may be eliminated in the stationary state while the generation units are not saturated or, in other words, have the capacity to generate all the reactive power that they may be commanded to. However, the integral controller may not required by grid operators, since it may cause fluctuations of reactive power generation and consumption by generators that do not have this type of control active and that are connected to a same point of the grid or are close to each other. This may be due to a disparity in the time constants of the controllers that the different generation units have implemented or to errors in the voltage measurements. It may be for this reason that most grid operators demand a proportional voltage controller.

However, the proportional controller can cause fluctuations in voltage, depending on the constant of the required proportional controller and the short circuit power, as well as delays in communications, digital delays, and delays associated to the response of reactive generation systems that the generation plant may have available (generator units, condenser banks, FACTS-type devices, etc.).

This fact may be caused due to the control being made based exclusively on the voltage measured at the connection point of the generation plant to the grid, which is much more likely to suffer variations with changes in the reactive and active power generated by the generation plant. Therefore, from the moment a change in voltage occurs until the central control detects it and generates the necessary reactive power commands, the generator units may be at a point of reactive power generation that may be opposite to that desired, increasing the voltage error.

From the moment the voltage reaches the reference voltage, until it is communicated to the generator units, they continue to generate reactive power as if there was an error, thus making the control fluctuate. Embodiments of the invention may eliminate voltage fluctuations in the face of changes in functioning conditions without having to resort to faster and therefore more expensive equipment and communication systems.

Figure 4:
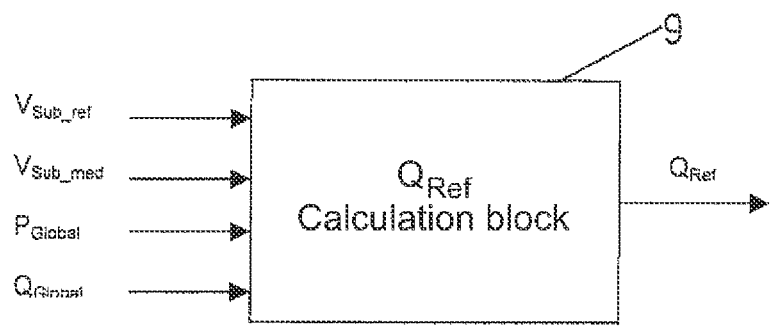
FIG. 4 shows a circuit diagram of a voltage controller.

FIG. 4 shows an embodiment for a calculation of the reactive power command ($Q_{ref}$). Block 9 may use measurements that may be made in the connection point to the grid of generated active power ($P_{global}$), reactive power ($Q_{global}$) and voltage ($V_{Sub}$). Likewise, the reference voltage ($V_{Sub\_ref}$) may be used appropriate to the point where the voltage control may be carried out. In various embodiments of the invention, said point corresponds to a point of the grid to which the power generation plant may be connected. For the calculation of said reactive power reference ($Q_{ref}$), block 9 may additionally use an equivalent model of the power grid to which the power generation plant is connected.

Figure 5:
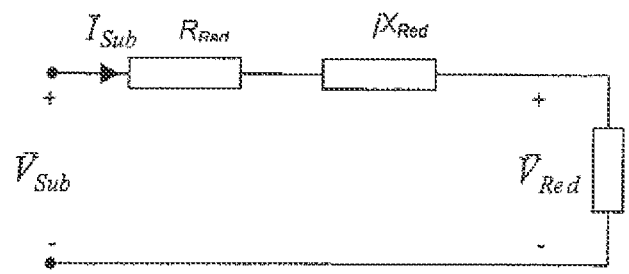
FIG. 5 shows an equivalent circuit per phase of a power grid.

FIG. 5 shows an equivalent circuit per phase. The voltage ($V_{Sub}$) may represent the voltage at the connection point to the grid of the power generation plant, while the voltage ($V_{Grid}$) may represent the grid voltage and the impedance of the grid may be given by a real part ($R_{Grid}$) and an imaginary part ($jX_{Grid}$). Using Park's transformation, the system of equations on axes (dq) that may govern the behaviour of the represented circuit, for a three-phase voltage system may be as follows:

$$V_{d\_Grid} = V_{d\_Sub} - R_{Grid} \cdot i_d + X_{Grid} \cdot i_q$$

$$V_{q\_Grid} = V_{q\_Sub} - R_{Grid} \cdot i_q + X_{Grid} \cdot i_d$$

The use of said grid equivalent model may be based on the assumption that the most sudden changes in substation voltage ($V_{Sub}$) may be directly related to changes in grid voltage ($V_{Grid}$). The use of these expressions may also require knowledge of the grid impedance ($R_{Grid}$) and ($X_{Grid}$). This impedance may depend on the consumption generation ratio, which may translate into variations in the value of ($R_{Grid}$) and ($X_{Grid}$) at each moment and may make use of the above expressions difficult.

Embodiments of the invention may assume impedance, leaving changes in the grid reflected only in the equivalent grid voltage. Said impedance may be evaluated from tests or be provided by the system operator. Upon detecting a change in the substation voltage ($V_{Sub}$), the grid voltage ($V_{Grid}$) that has caused said change may be calculated. To do so, in various embodiments of the invention, the currents ($i_d$) and ($i_q$) of the equations system above may be calculated based on the measurements of active power ($P_{global}$), reactive power ($Q_{global}$) and voltage ($V_{Sub}$) at the connection point to the grid (PCC), which, taking the substation voltage aligned to the axis (q), may be carried out according to the following expressions:

$$i_d = \frac{Q_{global}}{\sqrt{3} \cdot V_{Sub}}$$

$$i_q = \frac{P_{global}}{\sqrt{3} \cdot V_{Sub}}$$

Embodiments of the invention may comprise a proportional type control similar to that of FIG. 2. However, the proposed control may not directly use the voltage measured at the connection point ($V_{Sub\_med}$) for the calculation of the reactive power reference, but rather the voltage at that point corresponding to the stationary state, as shown in FIG. 6.

Figure 6:
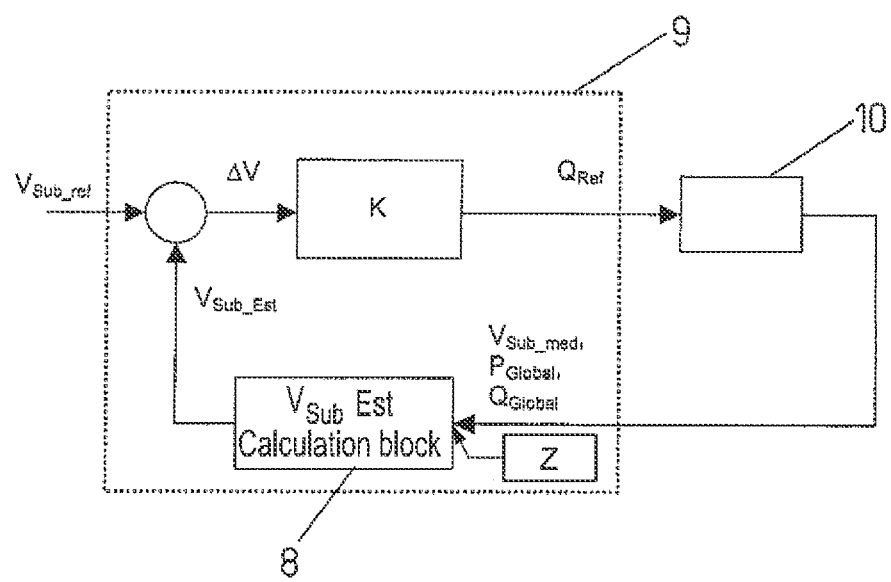
FIG. 6 shows a control circuit diagram.

FIG. 6 shows a control circuit. In it, based on the measurements taken at the connection point to the grid ($P_{global}$, $Q_{global}$, $V_{Sub}$), block 8 may calculate the voltage at the connection point corresponding to the stationary state ($V_{Sub\_Est}$) that will be reached in the new situation. Based on the error ($\Delta V$) existing between said calculated voltage ($V_{Sub\_Est}$) and the reference voltage ($V_{Sub\_Ref}$), a calculation may be made based on the proportionality constant required by the system's operator of the command for reactive power to be generated by the power generation plant.

To this effect, in various embodiments of the invention, since the transients in such an event are relatively fast, in the face of a change in voltage of the substation and until the new stationary situation is reached, the active power generated by the wind farm ($P_{Global}$) may not be substantially modified. Therefore, the active power generated in the future stationary state may correspond to that measured at that instant. At the same time, it may also be considered that the grid voltage ($V_{Grid}$) may not be substantially modified as a consequence of the control of the substation voltage.

Rather, the variables that may have been changed in the stationary state may be the generated reactive power ($Q_{Global}$) and the substation voltage ($V_{Sub}$) as a result.

In this way, the control system may provide, upon a change in the system's variables, the reference value of the reactive power ($Q_{ref}$) related to the new value of stationary voltage ($V_{Sub\_Est}$). When this command value of reactive power is applied as reference ($Q_{ref}$) to the wind farm 10, any fluctuation may be avoided, since the control may not take into account what has happened with the variables during the transient. This is how the problems resulting from delays in communication and response times of the generator units may be overcome.

Consistent with embodiments of the invention, the group of equations used in block 9 of FIG. 6 for the calculation of the substation voltage ($V_{Sub}$) in the future stationary state may be as follows:

$$V_{d\_Sub} = V_{d\_Grid} + R_{Grid} i_{d\_Sub} - X_{Grid} i_{q\_Sub}$$

$$V_{q\_Sub} = V_{q\_Grid} + R_{Grid} i_{q\_Sub} - X_{Grid} i_{d\_Sub}$$

$$V_{Sub} = \sqrt{V_{d\_Sub}^2 + V_{q\_Sub}^2}$$

$$Q_{Calc} = 3 \cdot (V_{q\_Sub} i_{d\_Sub} - V_{d\_Sub} i_{q\_Sub})$$

$$Q_{ref} = K \cdot (\Delta V)$$

$$Q_{Calc} = Q_{ref}$$

Figure 7:
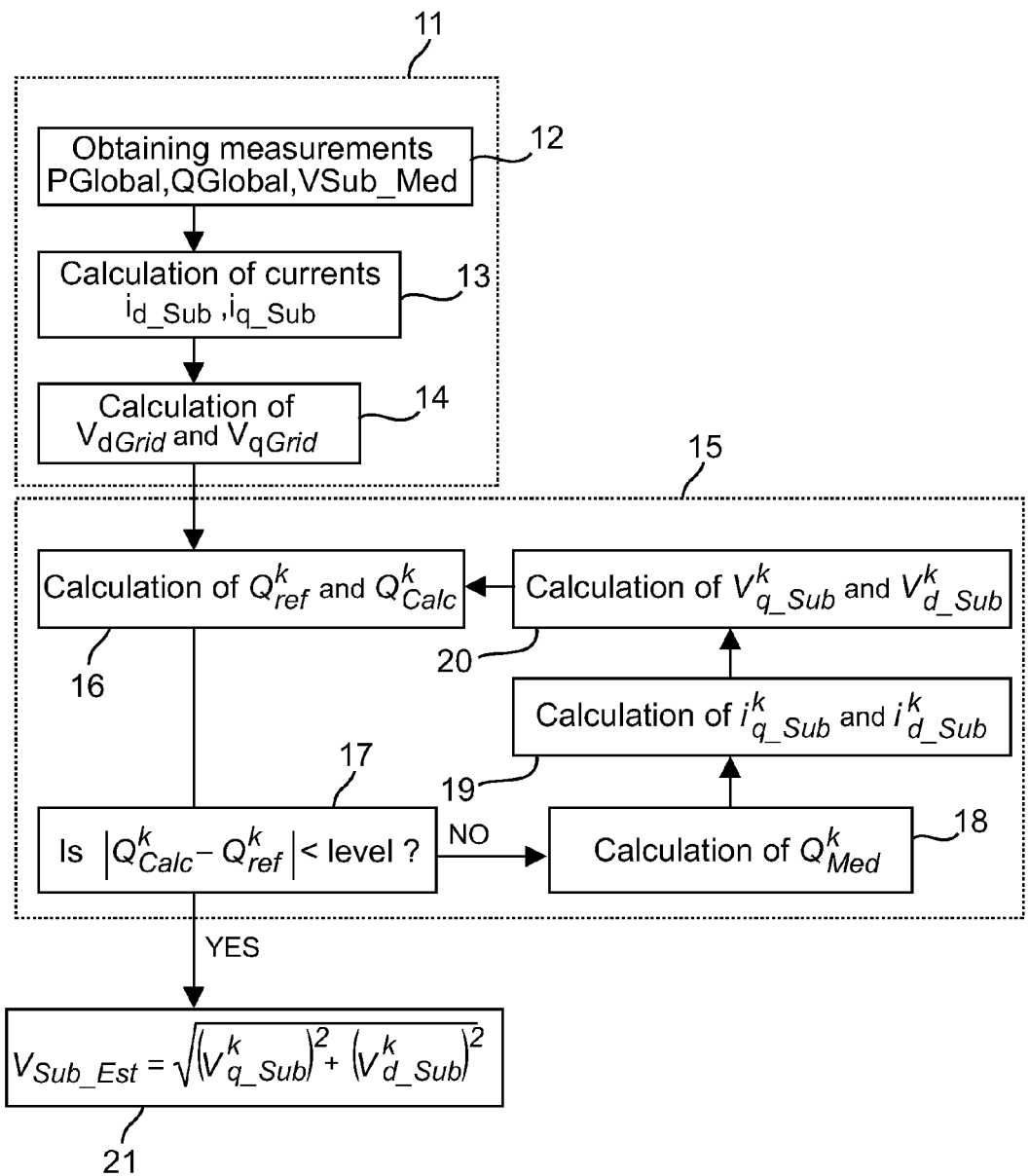
FIG. 7 is a flow chart showing an iterative solution method.

To resolve the above system of equations, embodiments of the invention may use an iterative method as show in FIG. 7. In block 11 a series of prior stages to the iterative process may be carried out, so as to obtain the variables necessary for said process.

First, measurements 12 may be obtained of active power generated by the wind farm ($P_{Global}$), total generated reactive power ($Q_{Global}$), and voltage at the connection point to the power grid or at the point at which the voltage control may be carried out ($V_{Sub}$). Next, current 13 may be calculated at the point at which the voltage control on axes may be carried out (dq), ($i_{d\_Sub}$) and ($i_{q\_Sub}$), based on the measurements of active power ($P_{global}$), reactive power ($Q_{global}$) and voltage ($V_{Sub}$) at the connection point to the grid (PCC), all of which, taking said voltage aligned with the axis (q), according to the following expressions:

$$i_{d\_Sub} = \frac{Q_{global}}{\sqrt{3} \cdot V_{Sub}}$$

$$i_{q\_Sub} = \frac{P_{global}}{\sqrt{3} \cdot V_{Sub}}$$

Then, grid voltage 14 may be calculated on axes (dq), ($V_{d\_Grid}$) and ($V_{q\_Grid}$), according to the equations that govern the behaviour of the equivalent circuit per phase of the electrical grid to which the wind farm is connected shown in FIG. 4. In other words, the following equations may be used:

$$V_{d\_Grid} = V_{d\_Sub} - R_{Grid} i_{d\_Sub} + X_{Grid} i_{q\_Sub}$$

$$V_{q\_Grid} = V_{q\_Sub} - R_{Grid} i_{q\_Sub} - X_{Grid} i_{d\_Sub}$$

Of the variables measured, calculated or estimated in block 11, the following may be presumed constant throughout the iterative process:

1) A total generated power ($P_{global}$), which follows a slow dynamic. It may be considered that in the face of a change in grid voltage and until the stationary subsequent to said change is reached, the variable that changes in consequence is the generated reactive power ($Q_{global}$); and 2) The grid voltage calculated on axes (dq), ($V_{d\_Grid}$ and ($V_{q\_Grid}$). It may be presumed that the generation or consumption of reactive power corresponding to the voltage control does not have an influence on said grid voltage, instead exclusively on the substation voltage.

Once the calculations in block 11 have been made, iterative process 15 may begin. First, block 16 may calculate the reactive powers ($Q_{ref}^k$) and ($Q_{Calc}^k$) based on the following expressions, where superscript K identifies the iteration number:

$$Q_{Calc}^k = 3 \cdot (V_{q\_Sub}^k i_{d\_Sub}^k - V_{d\_Sub}^k i_{q\_Sub}^k)$$

$$Q_{ref}^k = K \cdot (\Delta V^k)$$

Next, block 17 may check that the calculated reactive power corresponds effectively to the stationary state. To this effect, the calculation may be made of the difference between the reactive power calculated on the basis of the system's currents and voltages ($Q_{Calc}^k$) and the reference reactive power corresponding to said voltages ($Q_{ref}^k$). Said difference is referred to as error:

$$\text{Error} = |Q_{Calc}^k - Q_{ref}^k|$$

In embodiments of the invention, a boundary may be established which may not be exceeded by the error between the calculated reactive power and the reference reactive power, for the result to be considered as that corresponding to the stationary state:

$$|Q_{Calc}^k - Q_{ref}^k| < \text{Boundary}$$

If the error is greater than the established boundary, a new iteration may be initiated. Block 18 may then calculate a new reactive power ($Q_{Med}^k$) which may be calculated as a linear combination of ($Q_{Calc}^k$) and ($Q_{ref}^k$) with a view to the system converging, in the following manner:

$$Q_{Med}^k = K_1 \cdot Q_{Calc}^k + K_2 \cdot Q_{ref}^k$$

$K_1$ and $K_2$ may be adjusted previously in such a way that the number of iterations needed to reach the final result is minimised. Next, block 19 may calculate the currents ($i_{q\_Sub}^k$) and ($i_{d\_Sub}^k$) which may be established for the new situation of reactive power ($Q_{Med}^K$), taking into account that the active power remains constant, on the basis of the following expressions:

$$i_{d\_Sub}^k = \frac{P_{Global} \cdot V_{d\_Sub}^k + Q_{Med}^k \cdot V_{q\_Sub}^k}{3 \cdot \left((V_{d\_Sub}^k)^2 + (V_{q\_Sub}^k)^2\right)}$$

$$i_{q\_Sub}^k = \frac{P_{Global} \cdot V_{q\_Sub}^k - Q_{Med}^k \cdot V_{d\_Sub}^k}{3 \cdot \left((V_{d\_Sub}^k)^2 + (V_{q\_Sub}^k)^2\right)}$$

Then, block 20 may calculate the voltages at the point at which the control is carried out, based on the equations that model the behaviour of the grid to which the wind farm is connected and the previously calculated currents. This may take into account that ($V_{d\_Grid}$) and ($V_{q\_Grid}$) do not change in respect of the stage prior to the iterative process:

$$V_{d\_Sub}^k = V_{d\_Grid} + R_{Grid} \cdot i_{d\_Sub}^k - X_{Grid} \cdot i_{q\_Sub}^k$$

$$V_{q\_Sub}^k = V_{q\_Grid} + R_{Grid} \cdot i_{q\_Sub}^k + X_{Grid} \cdot i_{d\_Sub}^k$$

With the voltages and currents, within the iterative process 15, a calculation may be made once more of the reference reactive power and the calculated reactive power, and the iterative process may continue in a similar way. If indeed, in block 17, it may be verified that $|Q_{Calc}^k - Q_{ref}^k| <$ Boundary, the iterative process may conclude and in block 21 the voltage may calculated corresponding to the stationary state that may be reached as a consequence of the change in grid voltage and on generating the reactive power required for that new situation. Said voltage on axes (dq) may respond to the following expression:

$$V_{Sub\_Est} = \sqrt{(V_{q\_Sub}^k)^2 + (V_{d\_Sub}^k)^2}$$

As can be seen in FIG. 6, embodiments of the invention may use said stationary voltage ($V_{Sub\_Est}$) for the calculation of the error ($\Delta V$) to which a gain is applied (K) for the calculation of the reference reactive power. In various other embodiments, the system of equations resolved in block 9 of FIG. 4 may be such that it includes an equation that equals the reference voltage to the effective value of the voltage measured at the point where the control is carried out, this way imposing a null error in the stationary state.

From the solving of the system of equations, a production of reactive power ($Q_{Calc}$) may be obtained. This value may eliminate the error in the stationary state and may be the one issued as the reactive power command (Qref) in order to carry out the voltage control.

$$V_{d\_Sub} = V_{d\_Grid} + R_{Grid} \cdot i_{d\_Sub} - X_{Grid} \cdot i_{q\_Sub}$$

$$V_{q\_Sub} = V_{q\_Grid} + R_{Grid} \cdot i_{q\_Sub} - X_{Grid} \cdot i_{d\_Sub}$$

$$V_{Sub} = \sqrt{V_{d\_Sub}^2 + V_{q\_Sub}^2}$$

$$V_{Sub} = V_{ref}$$

$$Q_{Calc} = 3 \cdot (V_{q\_Sub} \cdot i_{d\_Sub} - V_{d\_Sub} \cdot i_{q\_Sub})$$

Figure 8:
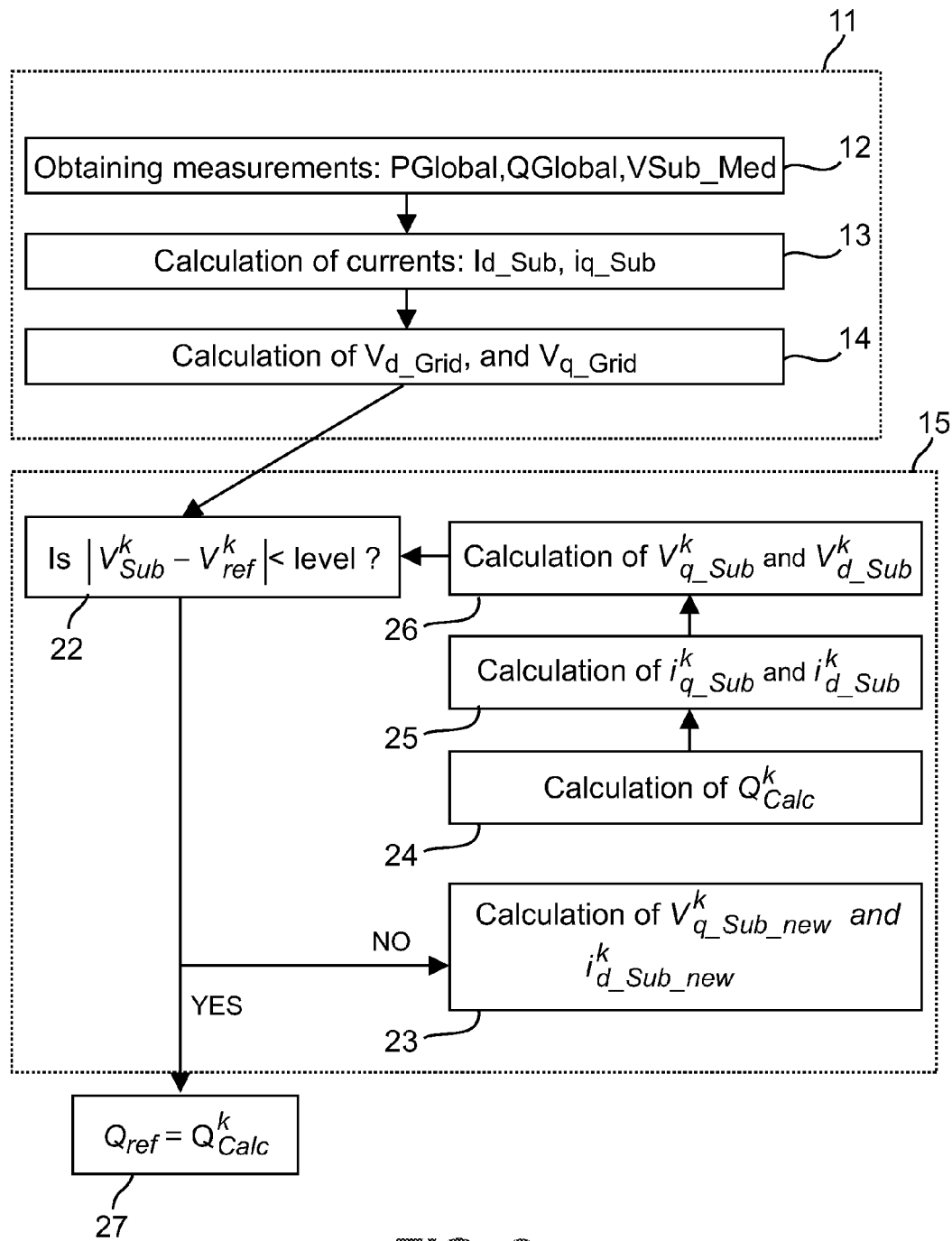
FIG. 8 is a flow chart showing another iterative solution method.

In order to solve the system of equations above, embodiments of the invention may consider an iterative method as show in FIG. 8. In the previous stages, related to block 11, at the beginning of the iterative process, the calculations may coincide with those explained previously for FIG. 7. in the same way as the hypotheses of the iterative process coincide, the generated power ($P_{Global}$) and the grid voltage ($V_{d\_Grid}$) and ($V_{q\_Grid}$) may remain constant from one stage to another of the iterative process.

Once the prior calculations have been made in block 11, the iterative process 15 may begin. First, block 22 may check that the calculated substation voltage (or measured in the case of the first iteration) and the reference substation voltage are approximately the same. In other words, that the error existing between them is less than a determined boundary level.

$$|V_{Sub}^k - V_{ref}| < \text{Boundary}$$

If the error is greater than the established boundary, a new iteration may begin. Block 23 may then calculate the target substation voltage on the axis (q) ($V_{q\_Sub\_Target}^k$), based on the command voltage ($V_{ref}$). To this effect it may be considered that the voltage on axis d does not change. Rather, it may coincide with that of the previous iteration. In other words:

$$V_{q\_Sub\_Target}^k = \sqrt{V_{ref}^2 - (V_{d\_Sub}^k)^2}$$

Based on said voltage and the grid model to which the park may be connected, block 23 may also calculate the target current on the axis (d) associated to the generation of reactive power, ($i_{d\_Sub\_Target}^k$) according to the following expression:

$$i_{d\_Sub\_Target}^k = \frac{(V_{q\_Sub\_Target}^k - V_{q\_Grid} - R_{Grid} \cdot i_{q\_Sub}^k)}{X_{Grid}}$$

To this effect, it may be considered that the current on the axis (q) remains constant. On the basis of said target current on the axis (d) and target voltage on the axis (q) in block 24, the target associated reactive power may calculated $Q_{Target}^K$:

$$Q_{Target}^K = 3(V_{q\_Sub\_Target}^k \cdot i_{d\_Sub\_Target}^k - V_{d\_Sub}^k \cdot i_{q\_Sub}^k)$$

Block 25 may calculate the currents ($i_{q\_Sub}^k$) and ($i_{d\_Sub}^k$) which are established for the new situation of reactive power ($Q_{Target}^K$), bearing in mind that the active power may remain constant, on the basis of the following expressions:

$$i_{d\_Sub}^k = \frac{P_{Global} \cdot V_{d\_Sub}^k + Q_{Target}^k \cdot V_{q\_Sub}^k}{3 \cdot \left((V_{d\_Sub}^k)^2 + (V_{q\_Sub}^k)^2\right)}$$

$$i_{q\_Sub}^k = \frac{P_{Global} \cdot V_{q\_Sub}^k + Q_{Target}^k \cdot V_{d\_Sub}^k}{3 \cdot \left((V_{d\_Sub}^k)^2 + (V_{q\_Sub}^k)^2\right)}$$

Block 26 may calculate of the voltages at the point where the control is carried out, on the basis of the equations that model the behaviour of the grid to which the wind farm is connected and the previously calculated currents, bearing in mind that ($V_{d\_Grid}$) and ($V_{q\_Grid}$) may not change in respect of the prior stages of the iterative process:

$$V_{d\_Sub}^k = V_{d\_Grid} + R_{Grid} \cdot i_{d\_Sub}^k - X_{Grid} \cdot i_{q\_Sub}^k$$

$$V_{q\_Sub}^k = V_{q\_Grid} + R_{Grid} \cdot i_{q\_Sub}^k + X_{Grid} \cdot i_{d\_Sub}^k$$

If effectively in block 22 it is verified that $|V_{Sub}^k - V_{ref}| <$ Boundary, the iterative process 15 may conclude and in block 27 the reactive power reference ($Q_{ref}$) may be generated, equaling it to the target reactive power ($Q_{Target}^K$) Thus, achieving a reactive power reference that may eliminate the voltage error in the future stationary state.

The blocks described above may correspond to different devices of which a control unit is made up, or alternatively a calculating unit may be adapted to carry out the calculations described above, with each described block being a stage of said calculation.

In various embodiments, a control unit of a wind farm may be a programmable device set up to run the method described above. Both iterative methods may be easy to implement in substation digital control systems, (PLC), and may require reduced calculation times.

Consistent with embodiments of the invention, a control system for a wind farm may comprise means for measuring electrical variables at the connection point of the power generation plant with said control unit.

Figure 9:
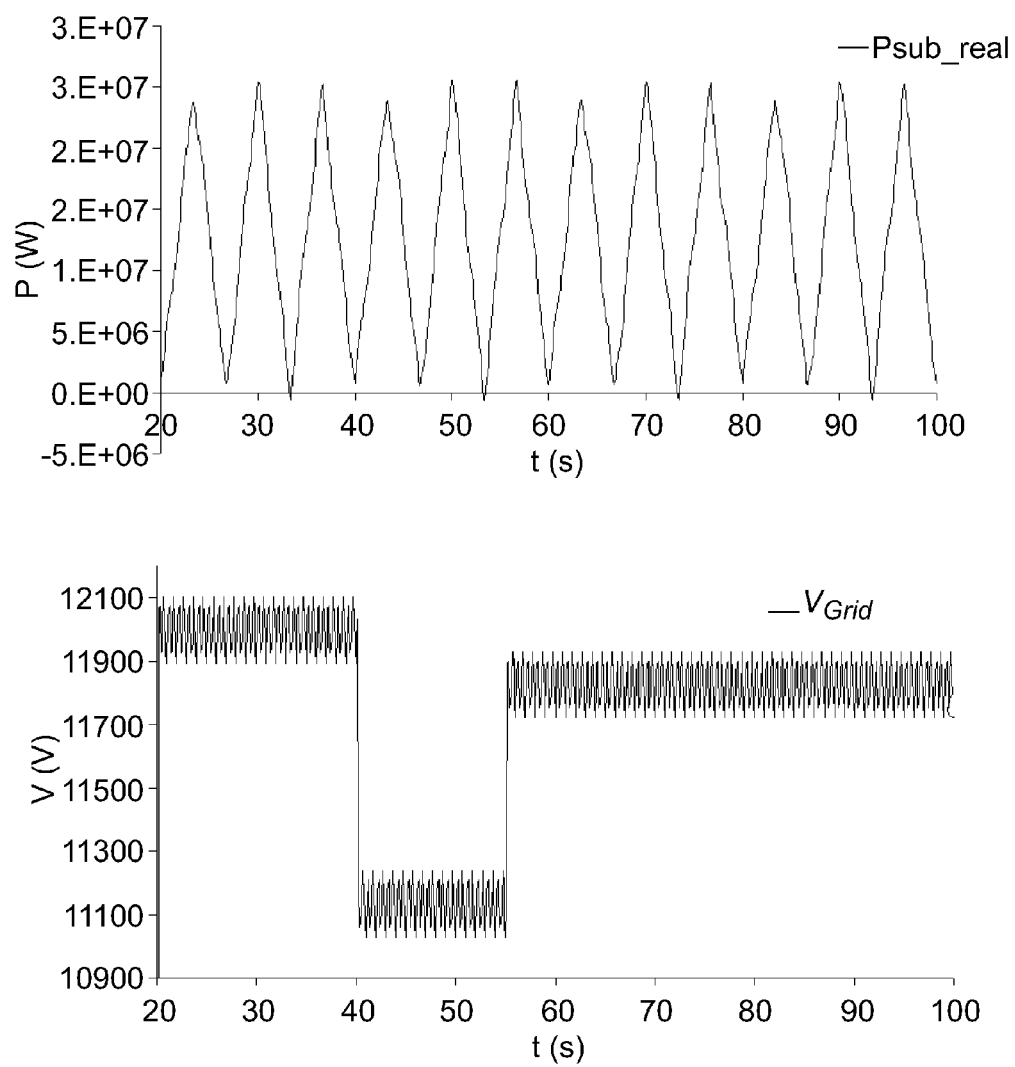
FIG. 9 shows the evolution of the grid voltage and the power of a wind farm.

FIG. 9 shows an active power generated by a wind farm with an installed rating of 27 MW and the equivalent grid voltage of the system. A fast variation in active power may be considered at the same time as a certain noise in grid voltage to analyse the robustness of control systems. In this generation situation, the response of different types of voltage controls may be analysed.

Figure 10:
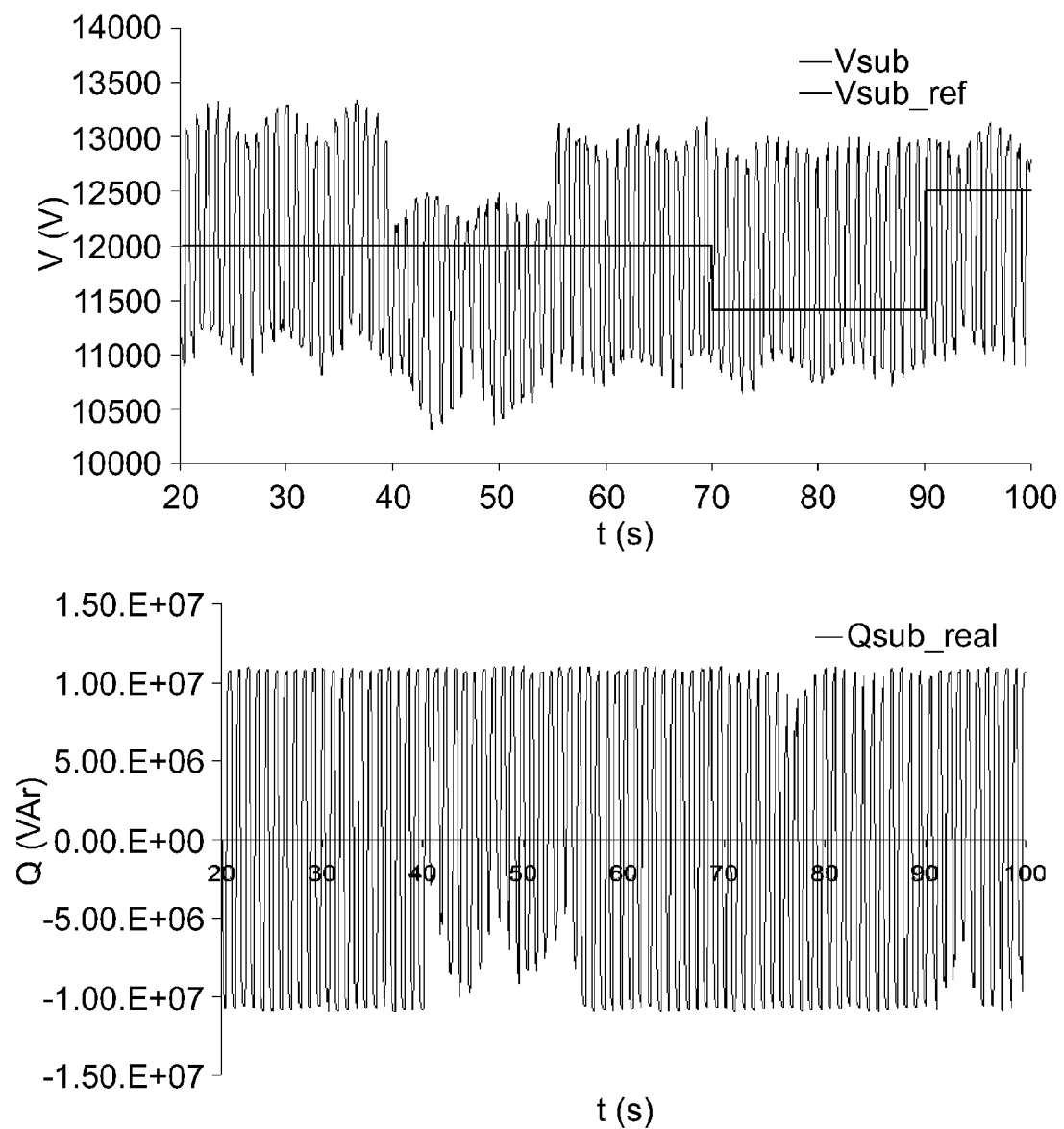
FIG. 10 shows an evolution of a reference and measured substation voltage and a measured reactive power of a wind farm.

FIG. 10 shows an evolution of the substation's voltage ($V_{Sub}$) and the reactive power ($Q_{sub\_real}$) generated by the wind farm with a conventional voltage control. The response required by the system's operator may be such that upon a deviation in voltage ($\Delta V$) of 4%, the wind turbines may generate all the reactive power that they are capable of, with the adequate sign, and with a speed of response of one second. It is verified that with this type of voltage control a good response may not achieved, since due to delays, characteristics of the grid, and the type of response required by the operator, the system becomes fluctuating.

Figure 11:
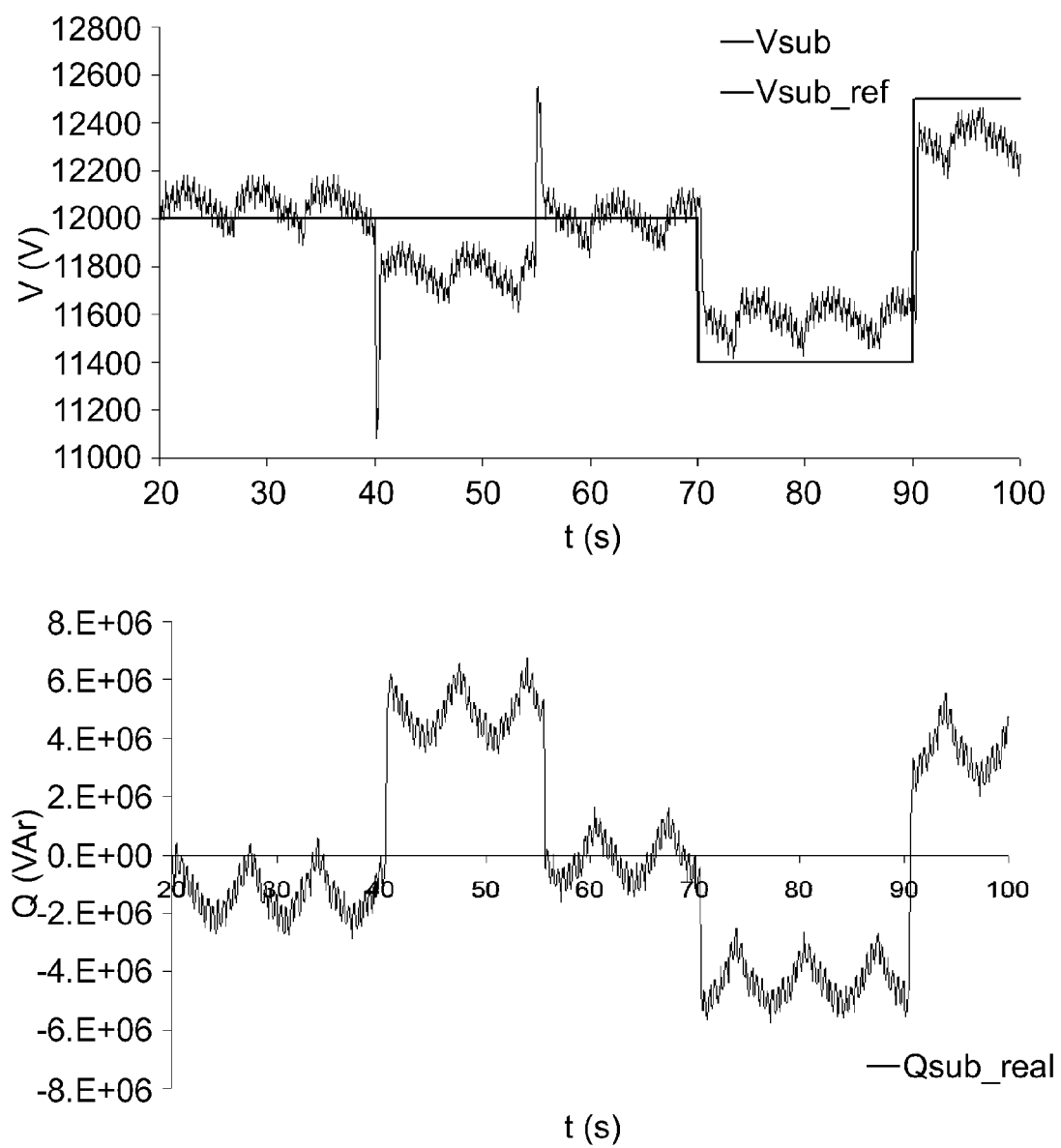
FIG. 11 shows another evolution of a reference and measured substation voltage and the measured reactive power of a wind farm.

FIG. 11 shows the evolution in the substation voltage ($V_{Sub}$) and the reactive power generated by the wind farm ($Q_{sub\_real}$) with a voltage control according to embodiments of the invention. The response required by the system's operator may be such that upon a deviation in voltage ($\Delta V$) of 4%, the wind turbines may generate all the reactive power that they are capable of, with the adequate sign, and with a speed of response of one second. It is verified that with this type of voltage control, a fast and stable response may be achieved, since from the first instant the reactive power command is calculated and sent that is suitable for the stationary state of the voltage. The fluctuations that may be observed are due to the weakness of the grid to which the wind farm is connected and to the fluctuations in generated active power and grid voltage. In addition, due to the characteristics of the required response, the error may not be eliminated in the stationary state.

Figure 12:
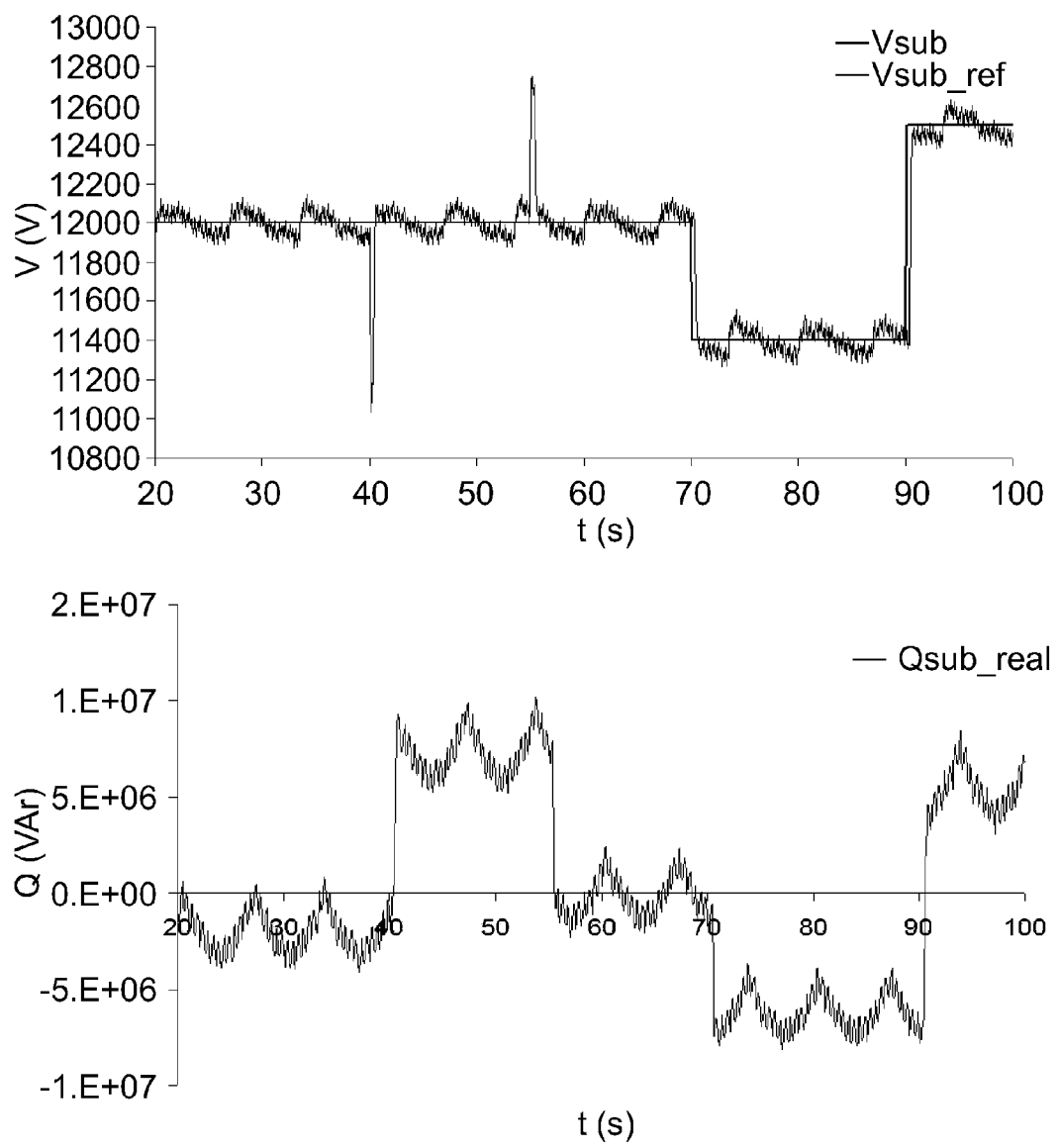
FIG. 12 shows yet another evolution of a reference and measured substation voltage and the measured reactive power of a wind farm.

FIG. 12 shows the evolution of the substation voltage ($V_{Sub}$) and the reactive power generated by the wind farm ($Q_{sub\_real}$) with a voltage control according to embodiments of the invention. In this case, the requirement may be to eliminate the voltage error in the stationary state. It is verified that with this type of voltage control, a fast and stable response may be achieved that, while the reactive capacity of the wind turbines allows it, may eliminate the error in the stationary state. The fluctuations that may be observed are due to the reasons set out above.

In various embodiments, a dynamic estimate may be made of the grid impedance value (Rgrid) and (Xgrid) based on the electric magnitudes measured at the connection point of the wind farm ($V_{Sub}$, $P_{Global}$, $Q_{Global}$, I, cos fi). The method of estimation may be based on solving a system of equations in the stationary regime, which may reflect the behavior of the grid at three instants that are close in time (t1), (t2), (t3). For the execution of the grid estimate, it may be assumed that at said instants the grid voltage module ($V_{Grid}$), as well as the grid impedance remains constant.

Said system of equations, with the electric variables expressed on axes (dq) synchronised at the frequency of the grid and the q axis being aligned with the substation voltage (Vsub), may remain as follows:

$$0 = V_{d\_Grid}^{t1} + R_{Grid} \cdot i_{d\_Sub}^{t1} - X_{Grid} \cdot i_{q\_Sub}^{t1}$$

$$V_{q\_Sub}^{t1} = V_{q\_Grid}^{t1} + R_{Grid} \cdot i_{q\_Sub}^{t1} + X_{Grid} \cdot i_{d\_Sub}^{t1}$$

$$0 = V_{d\_Grid}^{t2} + R_{Grid} \cdot i_{d\_Sub}^{t2} - X_{Grid} \cdot i_{q\_Sub}^{t2}$$

$$V_{q\_Sub}^{t2} = V_{q\_Grid}^{t2} + R_{Grid} \cdot i_{q\_Sub}^{t2} + X_{Grid} \cdot i_{d\_Sub}^{t2}$$

$$0 = V_{d\_Grid}^{t3} + R_{Grid} \cdot i_{d\_Sub}^{t3} - X_{Grid} \cdot i_{q\_Sub}^{t3}$$

$$V_{q\_Sub}^{t3} = V_{q\_Grid}^{t3} + R_{Grid} \cdot i_{q\_Sub}^{t3} + X_{Grid} \cdot i_{d\_Sub}^{t3}$$

The superscripts (t1), (t2), (t3) in the above system of equations may identify the instants in time to which the equations correspond. The currents ($i_{d\_sub}$) and ($i_{q\_sub}$), as well as the voltages ($V_{q\_sub}$) at each instant may be obtained on the basis of the measurements carried out at the connection point of the wind farm to the grid.

From the solution of the above system of equations the values of resistance ($R_{Grid}$) and inductance ($X_{Grid}$) of the equivalent grid model may be used for the voltage control.

Consistent with embodiments of the invention, the time cycle for estimating the equivalent grid impedance may be substantially greater for the voltage control. In various embodiments, records of several consecutive values of grid impedances may be saved in such a way that upon sudden changes in the value of said impedance, the parameters in the voltage control are modified so as to continue guaranteeing the stability of the control. Embodiments of the invention may comprise gain (K) for one of said parameters of the control shown in FIG. 6.

In various embodiments, upon sudden changes in the grid impedance value, the control system may signal this event by means of an alarm. In various other embodiments, various preset electric grid models may be available. Said electric grid models may be characterized by a grid impedance that can take on various preset values (provided for example by the operator of the grid to which the wind farm connects during the project definition stage). Said preset grid impedance values may be the values that the operator has characterised as predominant at the connection point of the wind farm to the grid.

In this case, the equations that govern the behaviour of the circuit represented in FIG. 5 may be resolved at each instant for all the impedance values provided by the electrical operator, thus calculating the grid voltage for each impedance value and taking, for the wind farm's voltage control, the value of the grid voltage obtained at each instant that results in a more stable value.

Consistent with embodiments of the invention, the system operator may provide two impedance values characterised by a resistance and a series impedance: $R_{Grid}^1$, $X_{Grid}^1$ in one case and $R_{Grid}^2$, $X_{Grid}^2$ in the other case. The solving of the equations on the dq axes (shown below) for the two impedance values, and based on the currents (id, iq) and voltages ($V_{d\_sub}$, $V_{q\_sub}$) measured at the connection point at each instant, may provide two grid voltage values ($V_{d\_Grid}^1$, $V_{q\_Grid}^1$ and $V_{d\_Grid}^2$, $V_{q\_Grid}^2$) expressed on dq axes.

$$V_{d\_Grid}^1 = V_{d\_Sub} - R_{Grid}^1 \cdot i_d + X_{Grid}^1 \cdot i_q$$

$$V_{q\_Grid}^1 = V_{q\_Sub} - R_{Grid}^1 \cdot i_q + X_{Grid}^1 \cdot i_d$$

$$V_{d\_Grid}^2 = V_{d\_Sub} - R_{Grid}^2 \cdot i_d + X_{Grid}^2 \cdot i_q$$

$$V_{q\_Grid}^2 = V_{q\_Sub} - R_{Grid}^2 \cdot i_q + X_{Grid}^2 \cdot i_d$$

In order to determine which may be the most stable value of grid voltage at each instant for use in the voltage control, embodiments of the invention may calculate the variance for an established period of time of each one of the signals of grid voltages ($V_{d\_Grid}^1$, $V_{q\_Grid}^1$ and $V_{d\_Grid}^2$, $V_{q\_Grid}^2$) obtained with each one of the preset impedances, or any other known method for quantifying a signal's variability.

Consistent with embodiments of the invention, indexes that are indicative of a change in the grid may be defined and calculated on the basis of the mobile integral of the absolute value of the derivative of the effective value of each one of the signals of grid voltage calculated with each one of the possible impedances ($Int(Abs(Der(V_{Grid}^1)))$, $Int(Abs(Der(V_{Grid}^2)))$) as a signal indicative of a change in the grid to which the wind farm may be connected. The calculation of the aforementioned indexes is done as follows:

$$(Int(Abs(Der(V_{Grid}^1)))) = \int \left|\frac{dV_{Grid}^1}{dt}\right| dt$$

$$(Int(Abs(Der(V_{Grid}^2)))) = \int \left|\frac{dV_{Grid}^2}{dt}\right| dt$$

When a change occurs in the grid, it may affect either the voltage of the equivalent model or the impedance thereof and both changes may be reflected in the indices indicative of the change in the grid ($Int(Abs(Der(V_{Grid}^1)))$, $Int(Abs(Der(V_{Grid}^2)))$). However, when the change in the grid affects the voltage of the equivalent model, said indexes ($Int(Abs(Der(V_{Grid}^1)))$, $Int(Abs(Der(V_{Grid}^2)))$) may evolve in a similar manner, whereas if the change in the grid affects the impedance of the equivalent model, the index calculated ($Int(Abs(Der(V_{Grid}^1)))$, $Int(Abs(Der(V_{Grid}^2)))$) with the inadequate impedance, may grow to a greater extent than the signal calculated with the correct impedance.

In order to distinguish between when the change occurs in the grid voltage and when it corresponds to a change in impedance, as a signal indicative of a change in impedance, the difference between the index indicative of the change in the grid calculated with the current impedance (used for the estimation of the grid voltage ($V_{Grid}$) used in the voltage control according to embodiments of this invention) and the index indicative of the change in the grid calculated with the rest of the possible impedances may be used. When said difference exceeds a certain threshold, that impedance which gives rise to a greater difference between indexes may be selected for the estimation of the grid voltage used in the voltage control.

Consistent with embodiment of the invention, reactive power command ($Q_{ref}$) may be calculated on the basis of the equivalent grid voltage ($V_{Grid}$) and may have a value that corresponds to the reactive power that the power generation plant must generate in a stationary manner in order to fulfill a previously preset law of control.

Because the reactive power command corresponds to that which the power generation plant must generate in the stationary state, this may prevent the delays that exist from the time of taking the measurements and calculating the commands for the generator units in the substation until the generator units receive them and generate in consequence (digital delays and delays in communication and systems' response), from affecting the system's controllability.

In embodiments of the invention, the law of control may define the reactive power to be generated ($Q_{ref}$) according to the voltage at the connection point of the power generation plant ($V_{Sub}$) and a reference voltage ($V_{ref}$). Moreover, the voltage at the connection point ($V_{Sub\_Est}$) that will be reached in a stationary manner may also be calculated on the basis of the equivalent grid voltage (VGrid) and assuming a generated reactive power equal to the command ($Q_{ref}$).

Said voltage control law, according embodiments of the invention, may be imposed by the grid operator responsible for safeguarding the stability of the power system and may correspond to a proportional control. In this case, the law of control that may define the required response for the power generation plant may include in addition to the reference voltage for the voltage at the connection point ($V_{ref}$), a constant (K) that relates the voltage at the connection point ($V_{Sub}$) and the reactive power ($Q_{ref}$) to be generated by the power generation plant.

Consistent with embodiments of the invention, the law of control may define the voltage that must be reached in a stationary manner at the point of connection of the wind farm ($V_{ref}$). In this way, the command ($Q_{ref}$) may correspond to the reactive power that must be generated by the power generation plant in a stationary manner in order to eliminate the error in the stationary state between the command voltage ($V_{ref}$) and the measured voltage.

By generating the command for reactive power based on the grid voltage ($V_{Grid}$), which is much more stable than the connection point voltage ($V_{sub}$), especially in the case of weak grids, the control may be more stable, as they are not subject to the fluctuations observed in said connection point voltage, which in consequence generate fluctuations in the reactive power commands. In this way, the voltage at the connection point of the power plant obtained by applying the method of the invention may be more stable.

Consistent with embodiments of the invention, the control method may further comprise dynamic estimation of the grid's electrical model based on the electrical magnitudes measured at the power generation plant's point of connection (Vs, P, Q, I, cos fi). In this way, changes in the power grid may be detected (disconnection of loads or generation units, etc.) which affect the grid's equivalent impedance. Because the grid model is used in the voltage control, detecting changes in impedance may allow the error made in calculating the reactive power commands to be minimized. Said grid electrical model consists of a resistance (R) and a series reactance (X).

Consistent with embodiments of the invention, records of several consecutive values of grid impedance may be saved in such a way that in the face of sudden changes in the value of said impedance, voltage control parameters may be modified, such as the response time or proportionality constant (K), in such a way that the stability of the control may continue to be guaranteed.

Consistent with embodiments of the invention, a voltage control system for a power generation plant may be provided, said system comprising means for measuring electric variables at the connection point of the power generation plant and a control unit that calculates from the electric variables a reactive power command ($Q_{ref}$) wherein moreover, the reactive power command is calculated applying a control method according to what has been described above. In addition, a wind farm characterised in that it comprises a control system configured in accordance with the embodiments of the invention may be provided.

What is claimed is:

1. A method for controlling a power generation plant connected to a power grid, the method comprising:
   at each of a plurality of points in time during operation of the power generation plant, generating a voltage control by:

(a) estimating an equivalent grid voltage ($V_{Grid}$) based on:
  electric magnitudes measured at a connection point of the power generation plant including a voltage measurement at the connection point, and
  an equivalent model of a power grid comprising an impedance of the power grid to which the power generation plant is connected;
(b) generating, on the basis of said estimated equivalent grid voltage ($V_{Grid}$) and a voltage reference ($V_{ref}$) for the power grid, a command indicative ($Q_{ref}$) of reactive power to be produced by the power generation plant;
(c) dynamically estimating the grid model on the basis of the electric magnitudes measured at the connection point of the power generation plant; and
(d) employing several consecutive values of grid impedances such that, upon sudden changes in the value of said impedance of the power grid, one or more parameters are modified in the voltage control to maintain stability of the voltage control.

2. The method of claim 1, wherein generating the command ($Q_{ref}$) indicative of the reactive power (Qref) comprises calculating, on the basis of the equivalent grid voltage ($V_{Grid}$), a value that corresponds to the reactive power that the power generation plant must generate in a stationary manner.

3. The method of claim 2, wherein the reactive power to be generated is based on a voltage at the connection point of the power generation plant ($V_{sub}$) and a reference voltage ($V_{ref}$).

4. The method of claim 3, further comprising calculating the voltage at the connection point ($V_{Sub\_Est}$) that will be reached in a steady state on the basis of the equivalent grid voltage ($V_{Grid}$), and assuming a generated reactive power equal to the command ($Q_{ref}$).

5. The method of claim 3, wherein a reference voltage ($V_{ref}$) for the voltage at the connection point and a constant (K) relates the voltage at the connection point ($V_{sub}$) and the reactive power to be generated.

6. The method of claim 2, further comprising defining the voltage that must be reached in a stationary manner at the connection point to the park.

7. The method of claim 1, wherein the electric grid model comprises a resistance (R) and a series reactance (X).

8. The method of claim 1, further comprising:
  calculating the equivalent grid voltage ($V_{Grid}$) for various preset electric grid models provided during definition and stored for use during operation of the power generation plant; and
  selecting at each moment a most stable equivalent grid voltage ($V_{Grid}$).

9. A voltage control system of a power generation plant, the system comprising:
  means for measuring electric variables at a connection point of the power generation plant, and
  a control unit that calculates, on a basis of electric variables, a command indicative of reactive power, the control unit being configured to:
    calculate an equivalent grid voltage at each of a plurality of points in time during operation of the power generation plant based on:
      electric magnitudes, including a voltage measurement, measured at the connection point of the power generation plant; and
      an equivalent model of a power grid comprising an impedance of the power grid;
    generate, on the basis of said estimated equivalent grid voltage ($V_{Grid}$), the command indicative of reactive power to be produced by the power generation plant;
    dynamically estimate the grid model on the basis of the electric magnitudes measured at the connection point of the power generation plant; and
    employ several consecutive values of grid impedances such that, upon sudden changes in the value of said impedance of the power grid, one or more parameters are modified in the voltage control to maintain stability of the voltage control.

10. The system of claim 9, wherein the system is used in a wind farm.

11. A method for controlling a power generation plant, the method comprising:
  estimating, at each of a plurality of points in time during operation of the power generation plant, an equivalent grid voltage based on:
    electric magnitudes measured at a connection point of the power generation plant including a voltage measurement at a connection point, and
    an equivalent model of a power grid comprising an impedance of the power grid to which the power generation plant is connected;
  generating, on the basis of said estimated equivalent grid voltage and a voltage reference for the power grid, a command indicative of reactive power to be produced by the power generation plant, wherein generating the command indicative of the reactive power comprises calculating, on the basis of the equivalent grid voltage, a value that corresponds to the reactive power that the power generation plant must generate in a stationary manner;
  calculating the equivalent grid voltage for various preset electric grid models provided during definition and stored for use during operation of the power generation plant, wherein calculating the equivalent model of the power grid takes into account an impedance of the power grid to which the power generation plant is connected;
  selecting at each moment a most stable equivalent grid voltage;
  dynamically estimating the grid model on the basis of the electric magnitudes measured at the connection point of the power generation plant; and
  employing several consecutive values of grid impedances such that, upon sudden changes in the value of said impedance of the power grid, one or more parameters are modified in the voltage control to maintain stability of the voltage control.

12. The method of claim 11, wherein the reactive power to be generated is based on a voltage at the connection point of the power generation plant and a reference voltage.

13. The method of claim 12, further comprising calculating the voltage at the connection point that will be reached in a steady state on the basis of the equivalent grid voltage, and assuming a generated reactive power equal to the command.

14. The method of claim 12, further comprising defining a reference voltage for the voltage at the connection point and a constant that relates the voltage at the connection point and the reactive power to be generated.

15. The method of claim 11, further comprising defining the voltage that must be reached in a stationary manner at the connection point to the park.

16. The method of claim 11, wherein the electric grid model comprises a resistance and a series reactance.

* * * * *